US012003078B2

(12) United States Patent
Shimada et al.

(10) Patent No.: US 12,003,078 B2
(45) Date of Patent: Jun. 4, 2024

(54) SPARK PLUG

(71) Applicant: NGK SPARK PLUG CO., LTD., Nagoya (JP)

(72) Inventors: Hiroki Shimada, Nagoya (JP); Haruki Yoshida, Nagoya (JP); Shota Takaenoki, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 0 days.

(21) Appl. No.: 17/911,859

(22) PCT Filed: Jan. 18, 2021

(86) PCT No.: PCT/JP2021/001441
§ 371 (c)(1),
(2) Date: Sep. 15, 2022

(87) PCT Pub. No.: WO2022/009453
PCT Pub. Date: Jan. 13, 2022

(65) Prior Publication Data

US 2023/0008031 A1 Jan. 12, 2023

(30) Foreign Application Priority Data

Jul. 6, 2020 (JP) ................................ 2020-116125

(51) Int. Cl.
*H01T 13/36* (2006.01)
*H01T 13/20* (2006.01)

(52) U.S. Cl.
CPC ............ *H01T 13/36* (2013.01); *H01T 13/20* (2013.01)

(58) Field of Classification Search
CPC .......... H01T 13/36; H01T 13/20; H01T 21/02
See application file for complete search history.

(56) References Cited

U.S. PATENT DOCUMENTS

2012/0267995 A1 10/2012 Shimamura et al.
2017/0033538 A1* 2/2017 Kobayashi ............. H01T 13/16
(Continued)

FOREIGN PATENT DOCUMENTS

JP 2012-69251 A 4/2012
JP 2013-101777 A 5/2013
(Continued)

OTHER PUBLICATIONS

International Search Report from corresponding International Patent Application No. PCT/JP21/01441, dated Apr. 6, 2021.

*Primary Examiner* — Elmito Breval
(74) *Attorney, Agent, or Firm* — KUSNER & JAFFE

(57) ABSTRACT

A spark plug which includes an insulator having an axial hole extending along an axial line, a metallic shell disposed around the insulator, and a center electrode disposed in the axial hole to be located on the forward end side of the axial line is provided. The insulator has a step portion provided on the outer circumferential surface thereof and facing toward the forward end side. The metallic shell has a receiving surface provided on the inner circumferential surface thereof and facing toward the rear end side and with which the step portion is engaged via a packing. A portion of the step portion on the outer circumferential side is a first curved surface being convex toward the forward end side, and a portion of the step portion on the inner circumferential side of the first curved surface is a second curved surface being convex toward the rear end side.

2 Claims, 3 Drawing Sheets

(56) References Cited

U.S. PATENT DOCUMENTS

2017/0346259 A1* 11/2017 Kawai .................... H01T 13/20
2017/0358904 A1 12/2017 Sadaka
2018/0366917 A1 12/2018 Ozeki et al.
2019/0312415 A1* 10/2019 Shimada ............. H01B 17/583

FOREIGN PATENT DOCUMENTS

JP 2017-107789 A 6/2017
JP 2017-224448 A 12/2017

* cited by examiner

SPARK PLUG

TECHNICAL FIELD

The present disclosure relates to a technique regarding a spark plug used in an internal combustion engine.

BACKGROUND ART

A spark plug has been used as an ignition means of an internal combustion engine such as an automotive engine. The spark plug includes a rod-shaped center electrode, an approximately cylindrical insulator which holds the center electrode therein, and a metallic shell which holds the insulator therein.

According to Japanese Patent Application Laid-Open (kokai) No. 2017-107789 disclosing a conventional technique regarding a spark plug, there is provided a spark plug including: a tubular metallic shell which has a shell inner step portion protruding in an inner peripheral direction and a bore extending in the direction of an axial line; an insulator which is inserted into the metallic shell and which has an axial hole extending in the direction of the axial line and has a facing portion facing the shell inner step portion via an annular packing; a center electrode which extends in the direction of the axial line, has a flange portion protruding in an outer peripheral direction, and is inserted into the axial hole; and a seal which is disposed in the axial hole for sealing between the insulator and the center electrode. In a cross section containing the axial line and extending along the axial line, a distance L between a rear end of the facing portion of the insulator and a rear end of a region where the flange portion is in contact with the insulator satisfies a relation of $L \leq 1.1$ (mm).

CITATION LIST

Patent Literature

Patent Literature 1: Japanese Patent Application Laid-Open (kokai) No. 2017-107789

SUMMARY OF INVENTION

Technical Problem

An object of the present disclosure is to enhance the gastightness of a spark plug.

Solution to Problem

According to one aspect of the present disclosure, a spark plug comprising an insulator having an axial hole extending along an axial line; a metallic shell disposed around the insulator; and a center electrode disposed in the axial hole to be located on a forward end side of the axial line is provided. The insulator has a step portion which is provided on an outer circumferential surface of the insulator and faces toward the forward end side. The metallic shell has a receiving surface which is provided on an inner circumferential surface of the metallic shell and faces toward a rear end side and with which the step portion is engaged via a packing. A portion of the step portion on an outer circumferential side is a first curved surface which is convex toward the forward end side, and a portion of the step portion on an inner circumferential side of the first curved surface is a second curved surface which is convex toward the rear end side.

Since the spark plug is configured as described above, the gastightness of the spark plug can be enhanced.

Preferably, the first curved surface is formed on the rear end side with respect to the second curved surface and has a radius of curvature greater than that of the second curved surface.

By virtue of this configuration, the area of contact between the first curved surface and the packing increases, whereby the gastightness is enhanced further.

Preferably, a rear end of an area of contact between the packing and the insulator is located on the rear end side with respect to a rear end of the first curved surface. A forward end of the area of contact is located on the inner circumferential side with respect to the receiving surface and is located on the outer circumferential side with respect to a point of connection between the first curved surface and the second curved surface.

By virtue of this configuration, the area of contact between the first curved surface and the packing increases, whereby the gastightness is enhanced further.

Advantageous Effects of Invention

According to the one aspect of the present disclosure, the gastightness of a spark plug can be enhanced.

DETAILED DESCRIPTION OF INVENTION

An embodiment of the present disclosure will now be described with reference to the drawings. In the following description, identical components are denoted by the same sign. The name and function of those components are the same. Therefore, the detailed description on those components will not be repeated.

Structure of Spark Plug

Figure 1:
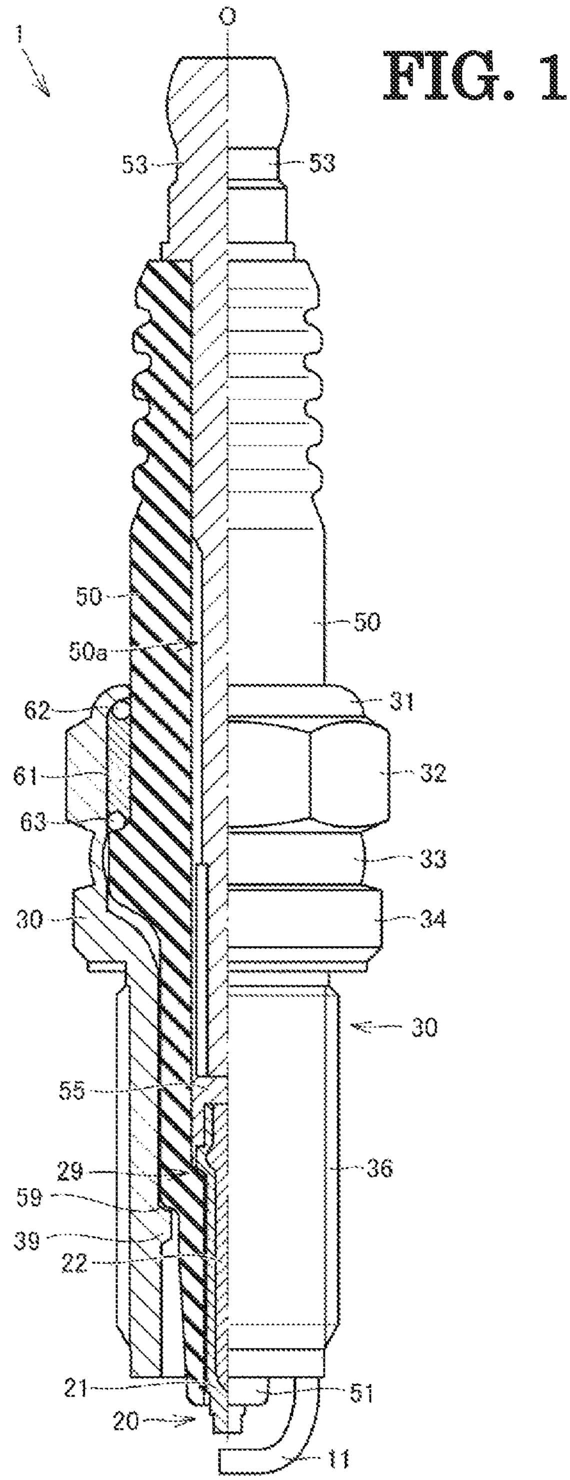
FIG. 1 is a half sectional view regarding one embodiment of the present disclosure and showing the appearance and internal structure of a spark plug.

First, the overall structure of a spark plug 1 according to the present embodiment will be described with reference to FIG. 1.

The spark plug 1 includes mainly a center electrode 20, an insulator 50, a metallic shell 30, etc.

The insulator 50 is an approximately cylindrical member extending in the longitudinal direction of the spark plug 1. An axial hole 50*a* extending along an axial line O is formed in the insulator 50. The insulator 50 is formed of a material which is excellent in insulating property, heat resistance, and thermal conductivity. For example, the insulator 50 is formed of an alumina-based ceramic material or the like.

The center electrode 20 is provided in a forward end portion 51 of the insulator 50. In the present embodiment, in the spark plug 1 and the insulator 50, a side where the center electrode 20 is provided is referred to as the forward end side of the spark plug 1 or the insulator 50, and a side opposite the forward end side is referred to as the rear end side. In each of FIGS. 1 to 3, the lower side of the drawing is the forward end side, and the upper side of the drawing is the rear end side.

A metallic terminal member 53 is attached to the other end portion (i.e., the rear end portion) of the insulator 50. An electrically conductive glass seal 55 is provided between the center electrode 20 and the metallic terminal member 53.

The center electrode 20 is inserted into and held in an axial hole 50*a* of the insulator 50 in such a manner that a forward end portion of the center electrode 20 protrudes from the forward end portion 51 of the insulator 50. Notably, the center electrode 20 and the insulator 50 are positioned with each other as a result of contact, at a center rod receiving position 29, between an outer diameter decreasing portion (a portion whose outer diameter decreases toward the forward end side) of the center electrode 20 and an inner diameter decreasing portion (a portion whose inner diameter decreases toward the forward end side) of the insulator 50.

The center electrode 20 includes an electrode base member 21 and a core 22. The electrode base member 21 is formed of, for example, a metallic material such as an Ni-based alloy containing Ni (nickel) as a main component. An example of an alloy element added to the Ni-based alloy is Al (aluminum). The core 22 is embedded in the electrode base member 21. The core 22 can be formed of a metallic material whose thermal conductivity is higher than the electrode base member (for example, Cu (copper) or a Cu alloy). The electrode base member 21 and the core 22 are united by forging. Notably, this structure is an example, and the core 22 may be omitted. Namely, the center electrode 20 may be composed of the electrode base member only.

A forward end portion of the electrode base member 21 is shaped such that its diameter decreases toward the forward end side.

The metallic shell 30 is an approximately cylindrical member which is fixed to a threaded hole of an internal combustion engine. The metallic shell 30 is provided to partially cover the insulator 50. As will be described later, in a state in which a portion of the insulator 50 is inserted into the approximately cylindrical metallic shell 30, a gap is present between the insulator 50 and a portion of the metallic shell 30 on the rear end side, and the gap is filled with talc 61.

The metallic shell 30 is formed of an electrically conductive metallic material. Examples of such a metallic material include low carbon steel and a metallic material which contains iron as a main component. The metallic shell 30 has mainly a crimp portion 31, a tool engagement portion 32, a curved portion 33, a bearing portion 34, and a trunk portion 36 in this order from the rear end side.

The tool engagement portion 32 is a portion with which a tool such as a wrench is engaged when the metallic shell 30 is attached to the threaded hole of the internal combustion engine. The crimp portion 31 is formed on the rear end side of the tool engagement portion 32. The crimp portion 31 is bent in such a manner that its radial position changes inward toward the rear end side. The bearing portion 34 is located between the tool engagement portion 32 and the trunk portion 36, and an annular gasket is disposed on the forward end side. In a state in which the spark plug 1 is attached to the internal combustion engine, the bearing portion 34 presses the annular gasket against an unillustrated engine head. The curved portion 33 having a small thickness is formed between the tool engagement portion 32 and the bearing portion 34. The trunk portion 36 is located on the forward end portion 51 side of the insulator 50. When the spark plug 1 is attached to the internal combustion engine, a screw groove (not shown) formed on the outer circumference of the trunk portion 36 is brought into thread-engagement with the threaded hole of the internal combustion engine.

Also, a ground electrode 11 is attached to a forward end portion of the metallic shell 30 (on the side where the trunk portion 36 is located). The ground electrode 11 is joined to the metallic shell 30 by, for example, welding. The ground electrode 11 is a plate-like member bent to have an approximately L-like shape as a whole, and a proximal end portion of the ground electrode 11 is fixedly joined to a forward end surface of the metallic shell 30. A distal end portion of the ground electrode 11 extends to a position through which an imaginary extension line of the axial line O of the insulator 50 passes. At a position near the distal end portion of the ground electrode 11, a noble metal tip (not shown) facing a forward end surface of the center electrode 20 is joined to a surface of the ground electrode 11 on the side toward the center electrode 20.

The ground electrode 11 is formed, for example, by using, as an electrode base material, a metallic material such as an Ni-based alloy containing Ni (nickel) as a main component. An example of an alloy element added to the Ni-based alloy is Al (aluminum). The ground electrode 11 may contain, as a component other than Ni, at least one element selected from Mn (manganese), Cr (chromium), Al (aluminum), and Ti (titanium).

Structure for Gastightness Between the Insulator and the Metallic Shell

Annular wire packings 62 and 63 are disposed in an annular region formed between an outer circumferential surface of a rear-end-side trunk portion of the insulator 50 and an inner circumferential surface of a portion of the metallic shell 30, which portion extends from the tool engagement portion 32 to the crimp portion 31. Powder of talc 61 is charged into the space between the two wire packings 62 and 63 in the region. The rear end of the crimp portion 31 is bent radially inward and is fixed to the outer circumferential surface of the insulator 50.

During manufacture, the curved portion 33 of the metallic shell 30 is formed through compressive deformation as a result of the crimp portion 31 being pressed toward the forward end side while being bent. Namely, as a result of formation of the crimp portion 31, the insulator 50 is pressed toward the forward end side within the metallic shell 30 via the wire packings 62 and 63 and the talc 61. At that time, a thin wall portion between the tool engagement portion 32 and the bearing portion 34 is compressively deformed, whereby the curved portion 33 is formed. Thus, an outer diameter decreasing portion 59 (a portion whose outer diameter decreases toward the forward end side) of the insulator 50 is pressed, via a plate packing 70 formed of iron, against a ledge portion 39, which is formed on the inner circumference of the metallic shell 30 to be located at a forward end portion of the metallic shell 30. As a result, the plate packing 70 prevents gas within a combustion chamber of the internal combustion engine from leaking to the outside through the gap between the metallic shell 30 and the insulator 50.

Figure 2:
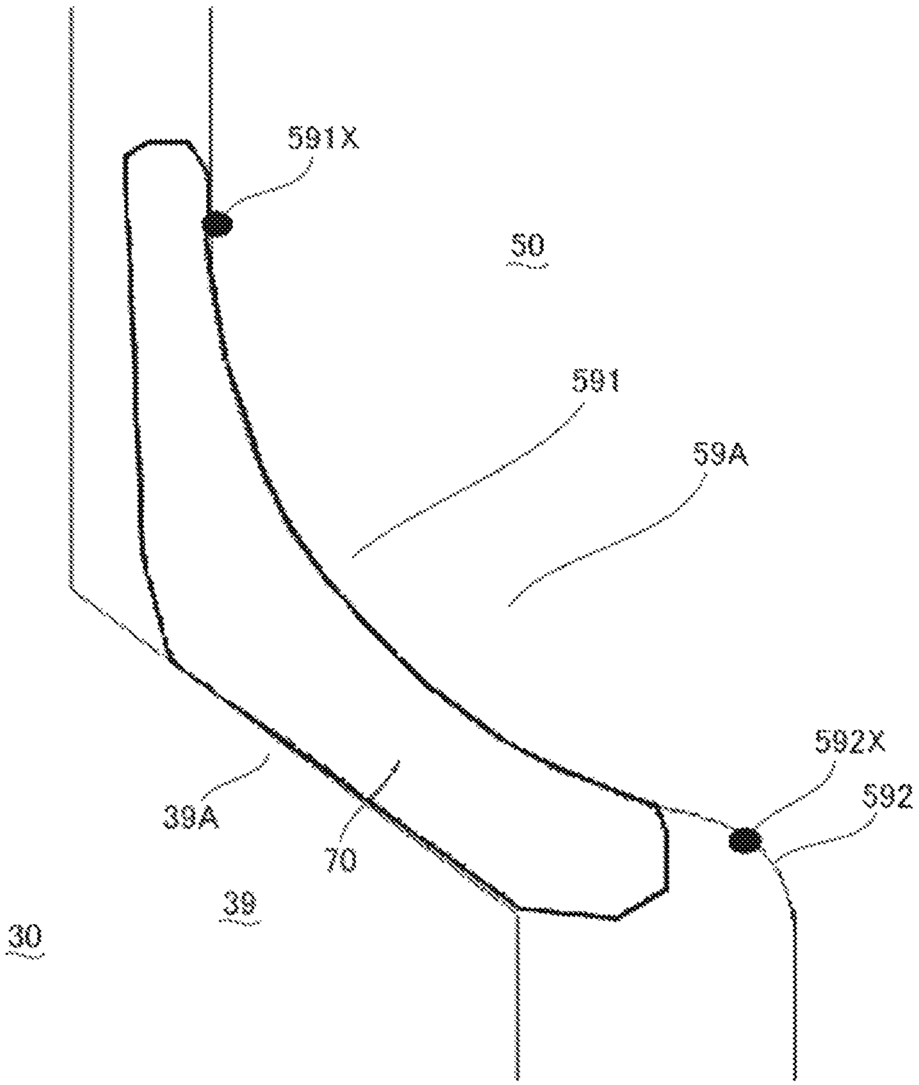
FIG. 2 is a side view regarding the embodiment of the present disclosure and showing the structure of a packing and its vicinity.

More specifically, in the present embodiment, a receiving surface 39A of the ledge portion 39 of the metallic shell 30 and a step portion 59A of the outer diameter decreasing portion 59 of the insulator 50 are formed to face each other approximately in parallel, as shown in FIG. 2. In a state in which the plate packing 70 is disposed between the receiving surface 39A of the ledge portion 39 of the metallic shell 30 and the step portion 59A of the outer diameter decreasing portion 59 of the insulator 50, the insulator 50 is pressed forward inside the metallic shell 30. At that time, the plate packing 70 is squeezed between the ledge portion 39 and the step portion 59A and is deformed. Namely, a forward surface of the plate packing 70 comes into tight contact with the receiving surface 39A of the ledge portion 39 of the metallic shell 30, and a rear surface of the plate packing 70 comes into tight contact with the step portion 59 A of the outer diameter decreasing portion 59 of the insulator 50. As a result, the gastightness of the gap between the metallic shell 30 and the insulator 50 is maintained.

In particular, in the present embodiment, the outer diameter decreasing portion 59 of the insulator 50 is formed to have two arcs as viewed in a side sectional view. More specifically, on an outer side portion (i.e., a portion on the outer circumferential side) of the outer diameter decreasing portion 59, a first curved surface 591 having an arcuate shape which is convex toward the forward end side, or the outer circumferential side, or the metallic shell 30 side is formed. On an inner side portion (i.e., a portion on the inner circumferential side) of the outer diameter decreasing portion 59, in other words, on the forward end side of the first curved surface 591, a second curved surface 592 having an arcuate shape which is convex rearward or toward the axial hole 50*a* is formed.

In the present embodiment, the radius of curvature of the first curved surface 591 is rendered larger than the radius of curvature of the second curved surface 592. By virtue of such a configuration, the area of contact between the first curved surface 591 and the plate packing 70 increases, whereby the gastightness can be enhanced further. Notably, from the viewpoint of stress dispersion and performance of tight contact with the plate packing 70, the radius of curvature of the first curved surface 591 and the radius of curvature of the second curved surface 592 may be adjusted appropriately. For example, the radius of curvature of the first curved surface 591 and the radius of curvature of the second curved surface 592 may be the same, or the radius of curvature of the second curved surface 592 may be larger than the radius of curvature of the first curved surface 591.

As described above, by forming the step portion 59A of the insulator 50 into an arcuate shape, stresses acting on the step portion 59A of the insulator 50 and its end portion can be dispersed. As a result, for example, when the insulator 50 is incorporated into the metallic shell 30, breakage of the step portion 59A of the insulator 50 and its end portion can be prevented. At the same time, by providing the first curved surface 591 on the step portion 59A of the insulator 50, the area of contact between the plate packing 70 and the insulator 50 can be increased, and, as a result, the gastightness between the receiving surface 39A of the ledge portion 39 of the metallic shell 30 and the step portion 59A of the outer diameter decreasing portion 59 of the insulator 50 can be enhanced. Also, by providing the second curved surface 592, the mechanical strength of the insulator 50 at the forward end portion of the step portion 59A can be increased. Since the insulator 50 has an increased mechanical strength, when the insulator 50 is incorporated into the metallic shell 30, the insulator 50 can be strongly pressed against the metallic shell 30. As a result, the shape of the plate packing 70 conforms to the insulator 50, whereby the gastightness can be enhanced.

Also, in the present embodiment, as shown in FIG. 2, the plate packing 70 is deformed by being squeezed between the receiving surface 39A of the ledge portion 39 of the metallic shell 30 and the step portion 59A of the outer diameter decreasing portion 59 of the insulator 50. The plate packing 70 is deformed in such a manner that the end of the deformed plate packing 70 on the rear end side is located rearward of the end portion 591X of the first curved surface 591. By virtue of this, the area of contact between the plate packing 70 and the insulator 50 increases. As a result, the gastightness between the metallic shell 30 and the insulator 50 can be enhanced. Also, the plate packing 70 is deformed in such a manner that the end of the deformed plate packing 70 on the forward end side (i.e., on the inner circumferential side) is located on the outer circumferential side with respect to a point of connection 592X between the first curved surface 591 and the second curved surface 592. By virtue of this, the force with which the plate packing 70 presses the insulator 50 toward the axial line O becomes weak. As a result, breakage of the insulator 50 due to interference of the plate packing 70 can be prevented.

Figure 3:
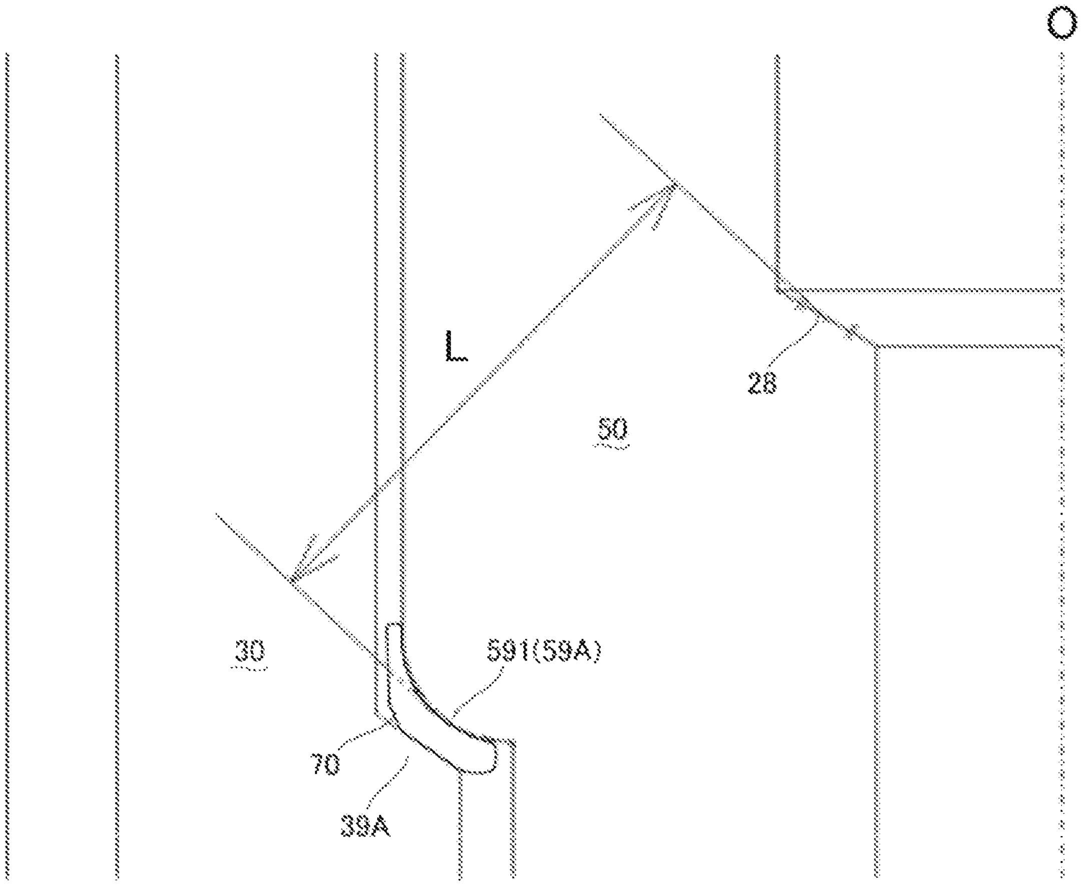
FIG. 3 is a side sectional view regarding the embodiment of the present disclosure and showing the positional relation between a packing contact portion and a center rod receiving position.

Also, in the present embodiment, it is preferred that, as shown in FIG. 3, the maximum distance L from the center rod receiving position 29 (i.e., the intermediate point of a contact portion of the inner diameter decreasing portion 58 of the insulator 50 in contact with the outer diameter decreasing portion 28 of the center electrode 20) to the the area of contact between the plate packing 70 and the first curved surface 591 of the insulator 50 is equal to or greater than 3.046 mm. In other words, it is preferred that the distance L from the center rod receiving position 29 to a furthest portion of the first curved surface 591 is equal to or greater than 3.046 mm. For example, it is more preferred that the distance L is equal to or greater than 3.102 mm. When the distance L is set in such a manner, the gastightness realized by the packing 70 is enhanced further.

Enhancement of the gastightness realized by the packing 70 was confirmed as follows. Namely, a spark plug 1 (sample 1) including an insulator 50 whose distance L was 3.046 mm and a spark plug 1 (sample 2) including an insulator 50 whose distance L was 3.102 mm were prepared. The samples 1 and 2 differ only in the distance L and are substantially the same in structure. Also, as comparative examples, there were prepared a spark plug (sample 3) having the same structure as the sample 1 except that the first curved surface was changed to a flat surface and a spark plug (sample 4) having the same structure as the sample 2 except that the first curved surface was changed to a flat surface. Each sample was attached to a bush made of SUS, and a space on the center electrode side was maintained at 2 MPa. In this state, the temperature of the bush was elevated. The flow rate (ml/min) of air leaking through the gap between the metallic shell and the insulator was measured, and the temperature was measured when the flow rate exceeded a predetermined value. The temperatures of samples 1 to 4 when the flow rate reached the predetermined value were 220° C., 240° C., 210° C., and 210° C., respectively.

CONCLUSION

As described above, in the present embodiment, the spark plug 1 which includes: the insulator 50 having an axial hole extending along the axial line; the metallic shell 30 disposed around the insulator 50; and the center electrode 20 disposed in the axial hole to be located on the forward end side of the axial line is provided. The insulator 50 has the step portion 59A which is provided on the outer circumferential surface thereof and which faces toward the forward end side. The metallic shell 30 has the receiving surface 39A which is provided on the inner circumferential surface thereof and faces toward the rear end side, and with which the step portion 59A is engaged via the packing 70. A portion of the step portion 59A on the outer circumferential side is the first curved surface 591 which is convex toward the forward end side, and a portion of the step portion 59A on the inner circumferential side of the first curved surface 591 is the second curved surface 592 which is convex toward the rear end side.

By virtue of this configuration, the gastightness of the spark plug 1 can be enhanced.

Preferably, the first curved surface 591 is formed on the rear end side with respect to the second curved surface 592 and has a radius of curvature greater than that of the second curved surface 592.

By virtue of this configuration, the area of contact between the first curved surface 591 and the packing 70 increases, whereby the gastightness is enhanced further.

Preferably, the rear end of the area of contact between the packing 70 and the insulator 50 is located on the rear end side with respect to the rear end of the first curved surface 591. The forward end of the area of contact is located on the inner circumferential side with respect to the receiving surface 39A and is located on the outer circumferential side with respect to the point of connection between the first curved surface 591 and the second curved surface 592.

By virtue of this configuration, the area of contact between the first curved surface 591 and the packing 70 increases, whereby the gastightness is enhanced further.

The embodiments disclosed this time must be considered to be illustrative and not restrictive in all aspects. It is intended that the scope of the present disclosure is shown by the claims rather than the above description, and the present disclosure encompasses all modifications within the meanings and scopes equivalent to those of the claims. Also, the present disclosure encompasses configurations obtained by combining the configurations of different embodiments described in the present specification.

REFERENCE SIGNS LIST

1: spark plug
11: ground electrode
20: center electrode
21: electrode base member
22: core
28: outer diameter decreasing portion
29: center rod receiving position
30: metallic shell
31: crimp portion
32: tool engagement portion
33: curved portion
34: bearing portion
36: trunk portion
39: ledge portion
39A: receiving surface
50: insulator
50*a*: axial hole
51: forward end portion
53: metallic terminal member
55: glass seal
58: inner diameter decreasing portion
59: outer diameter decreasing portion
59A: step portion
61: talc
62: wire packing
63: wire packing
70: plate packing
591: first curved surface
591X: end portion
592: second curved surface
592X: point of connection
O: axial line

What is claimed is:

1. A spark plug comprising:

an insulator having an axial hole extending along an axial line;

a metallic shell disposed around the insulator; and a center electrode disposed in the axial hole to be located on a forward end side of the axial line, wherein the insulator has a step portion which is provided on an outer circumferential surface of the insulator and faces toward the forward end side, wherein the metallic shell has a receiving surface which is provided on an inner circumferential surface of the metallic shell and faces toward a rear end side and with which the step portion is engaged via a packing, wherein a portion of the step portion on an outer circumferential side is a first curved surface which is convex toward the forward end side, wherein a portion of the step portion on an inner circumferential side of the first curved surface is a second curved surface which is convex toward the rear end side, wherein a rear end of an area of contact between the packing and the insulator is located on the rear end side with respect to a rear end of the first curved surface, and wherein a forward end of the area of contact is located on the inner circumferential side with respect to the receiving surface and is located on the outer circumferential side with respect to a point of connection between the first curved surface and the second curved surface.

2. The spark plug according to claim 1, wherein the first curved surface is formed on the rear end side with respect to the second curved surface and has a radius of curvature greater than that of the second curved surface.

* * * * *